July 6, 1948.　　　　G. D. GILLETT　　　　2,444,734
BACKLASH ELIMINATOR FOR PLANETARY GEARS
Filed Sept. 14, 1944　　　　　　　　　　　　2 Sheets-Sheet 1

Inventor
GLENN D. GILLETT

Attorney

July 6, 1948.  G. D. GILLETT  2,444,734
BACKLASH ELIMINATOR FOR PLANETARY GEARS
Filed Sept. 14, 1944  2 Sheets-Sheet 2

GLENN D. GILLETT, Inventor

Attorney

Patented July 6, 1948

2,444,734

UNITED STATES PATENT OFFICE 2,444,734

BACKLASH ELIMINATOR FOR PLANETARY GEARS

Glenn D. Gillett, New London, Conn., assignor to the United States of America as represented by the Secretary of the Navy Application September 14, 1944, Serial No. 554,083

2 Claims. (Cl. 74—305)

The present invention relates to a means for eliminating backlash in a gear train. More particularly it relates to a means for eliminating backlash in a planetary differential gear train.

The gear train described hereinafter is a component in a mechanism wherein the movement of one part is to be controlled by the movements of two independent control means working either simultaneously or singly. In this operation extreme accuracy is required and backlash cannot be tolerated. The object of the present invention is to provide a means for eliminating backlash quickly and without resorting to the use of gears of greater accuracy than those commercially available.

In the accompanying drawings.

Figure 1:
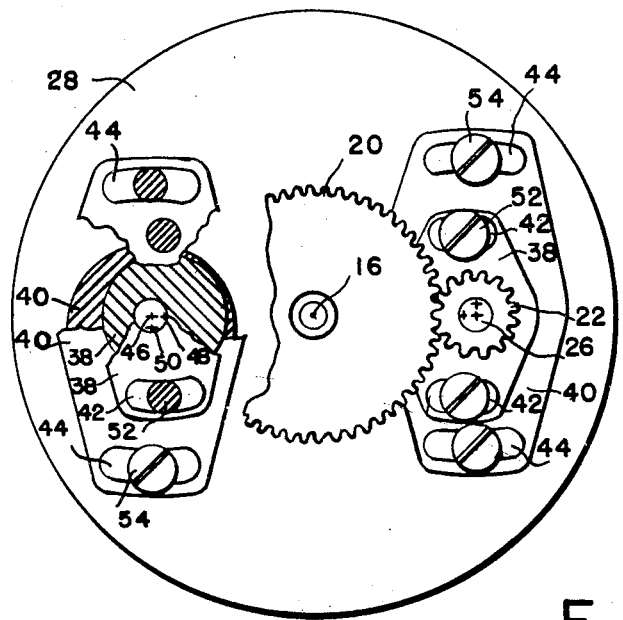
Fig. 1 is a plan view, partly broken away, of the device.
Figure 2:
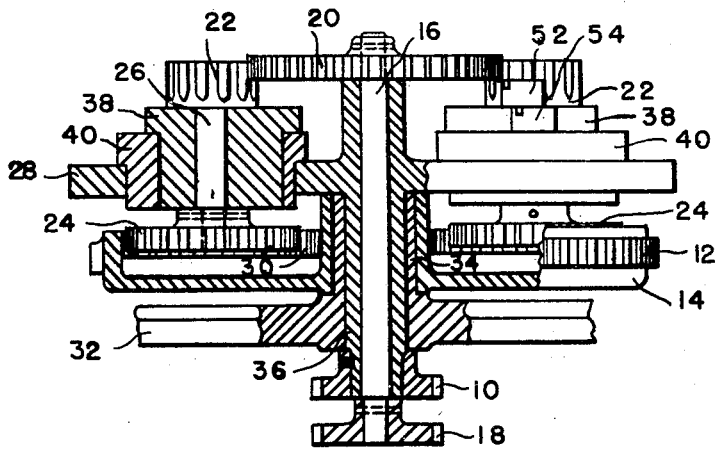
Fig. 2 is an elevation, in section.

Referring to Figs. 1 and 2, the rotation of a gear 10 is to be established by motion imparted to the differential either through external teeth 12 on a ring gear 14, or through a shaft 16 and gear 18, or both. The planetary differential is composed of a sun gear 20 carried on the shaft 16, planetary gears 22 and 24 carried on shafts 26 in a plate 28, and internal teeth 30 of the ring gear 14. The gears 22 and 24 mesh respectively with the sun gear 20 and the internal ring gear 30. The entire differential is carried on a fixed member 32; the ring gear 14 revolves on an extension 34 of the fixed member. A hub 36 of the plate 28 passes through the extension 34 and carries the driven gear 10; and the shaft 16, in turn, rotates in the plate 28 and its hub 36.

If the shafts 26 are rigidly carried in the plate 28, backlash will occur between gears 20 and 22 and between gears 24 and 30. To eliminate the backlash, eccentric bushings 38 and 40 are interposed between the shaft 26 and the plate 28. The bushings 38 and 40 each consist of a cylindrical portion and a flange with two diametrically opposed ears in each of which are arcuate slots 42 and 44 respectively concentric with the outer cylindrical portions of the two bushings. The shaft 26 passes through bushing 38 in a hole, the axis 46 of which is displaced from the axis 48 of the cylindrical section of bushing 38 in a direction perpendicular to the center line of the ears of the bushing. Bushing 38 is carried in eccentric bushing 40 in a hole, the axis 48 of which is so located in respect to the axis 50 of the cylindrical portion of bushing 40 that, when the center lines of the ears of the two bushings are parallel, the axis 46 of the shaft 26 is displaced from the axis 50 of bushing 40 along the center line of its ears by a distance equal to that between axes 46 and 48.

Bushing 38 is secured to bushing 40 by screws 52 passing through the slots 42 in the ears of bushing 38, and bushing 40 is likewise secured to the plate 28 by screws 54. These screws enter holes so placed that when the center lines of the two pairs of ears are parallel and perpendicular to the line joining the axes of the shafts 16 and 26, the screws will be on the center lines of their respective ears.

These bushings are used as follows to eliminate backlash.

Figure 3:
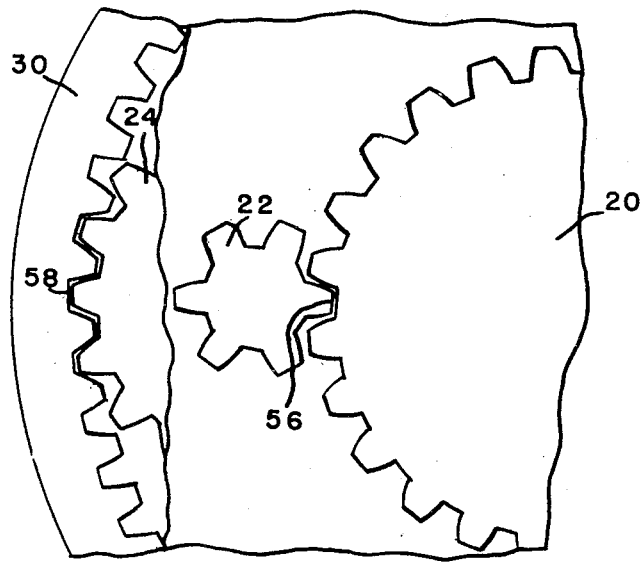
Fig. 3 is a diagrammatic drawing showing the first stage of backlash elimination.

When the screws 54 are loosened and bushing 40 is rotated, the axis 46 of shaft 26 is rotated about axis 50 of bushing 40, and moves essentially radially with respect to shaft 16. In this manner each shaft 26 may be so positioned that, as shown in Fig. 3, the clearances 56 between gears 20 and 22 and 58 between gears 24 and 30 are made equal. When this has been done the screws 54 are tightened.

Figure 4:
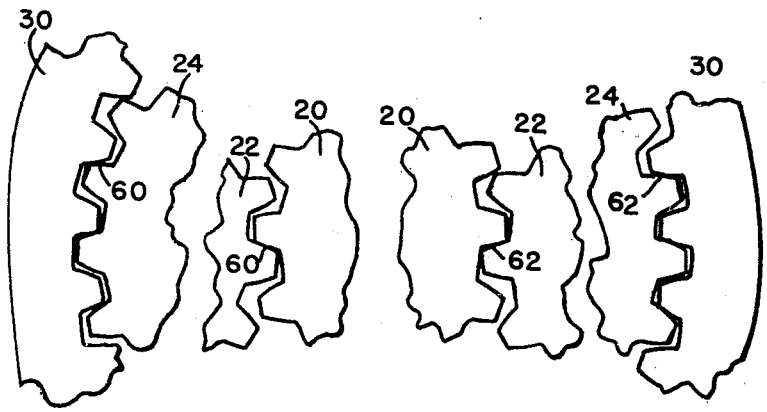
Fig. 4 is a diagrammatic drawing showing the final stage.

When one pair of the screws 52 is loosened and one of the bushings 38 is rotated, the axis 46 of the associated shaft 26 is rotated about axis 48 of bushing 38, and moves essentially circumferentially with respect to the gear 20. This motion forces one face of the teeth of one set of gears 22 and 24 into contact with the gears 20 and 30 as shown at 60 in Fig. 4 and at the same time causes gears 20 and 30 to rotate slightly and come into contact with the opposite face of the teeth of the other set of gears 22 and 24 as shown at 62 in Fig. 4. When this has been done the screws 52 are tightened.

Backlash is eliminated because the teeth of gears 20 and 30 bear firmly against those of gears 22 and 24 irrespective of the direction of rotation.

A similar arrangement of adjustment in one of the bearings in a closed train of any number of gears may be used to eliminate the backlash in the train. The adjustment, obviously, would be in a direction substantially normal to the line between the points of mesh with the two adjacently meshing gears to substantially preserve the tangentiality of the pitch circles of the gears. The gear selected for the adjustability should preferably be one which is on a direct line between the axes of the adjacent gears, in which case the tangentiality above referred to may be better preserved.

It should be noted that in the illustrative example shown in the present drawings, only one of the shafts 26 needs to be adjustably mounted, although for some purposes more than one might be preferable in order to reduce the amount of adjustment necessary at each point or for other purposes.

Other modifications and adaptations of this device may be made without departing from the spirit and scope of this invention. as defined in the appended claims.

What is claimed is:

1. In a planetary differential gear train, the combination of a plate support, a pair of rotatable members associated therewith, external and internal gears operatively attached to said members, respectively, said plate support having an opening, a first bushing rotatably mounted in said opening, diametrically-opposite ears extending from said first bushing and slidably engaging said plate support, said first bushing having an eccentric opening therethrough, a second bushing rotatably mounted in said eccentric opening, diametrically-opposite ears extending from said second bushing and slidably engaging said ears extending from said first bushing, said second bushing having an eccentric opening therethrough, a shaft rotatably mounted therein and extending through the same, intermediate gears secured to the ends of said shaft and meshing with said external and internal gears, respectively, said intermediate gears engaging opposite ends of said second bushing for retaining said shaft against axial movement thereof, means releasably locking the diametrically-extending ears of said first bushing to said plate support whereby said bushing may be adjusted relative to said plate support, and means releasably locking the diametrically-extending ears of said second bushing to said ears of said first bushing whereby said second bushing may be rotatably adjusted relative to said first bushing.

2. In a planetary differential gear train, the combination of a plate support having an opening, a first bushing rotatably mounted in said opening, said first bushing having an eccentric opening therethrough, a second bushing rotatably mounted in said eccentric opening, said second bushing having an eccentric opening therethrough, a shaft rotatably mounted therein and extending through the same, gears secured to the ends of said shaft and engaging opposite ends of said second bushing for retaining said shaft against axial movement thereof, means releasably locking said first bushing to said plate support whereby said bushing may be adjusted relative to said plate support, and means releasably locking said second bushing to said first bushing whereby said second bushing may be rotatably adjusted relative to said first bushing.

GLENN D. GILLETT.

REFERENCES CITED

The following references are of record in the file of this patent:

UNITED STATES PATENTS

| Number | Name | Date |
| --- | --- | --- |
| 717,924 | Reid | Jan. 6, 1903 |
| 1,108,422 | Barnum | Aug. 25, 1914 |
| 1,130,053 | Barnum | Mar. 2, 1915 |
| 1,171,347 | Morse | Feb. 8, 1916 |
| 1,227,382 | Cardin | May 22, 1917 |
| 1,766,414 | Thompson | June 24, 1930 |
| 1,987,674 | Ford | Jan. 15, 1935 |
| 2,016,149 | Leach | Oct. 1, 1935 |
| 2,027,592 | Hoffman | Jan. 14, 1936 |
| 2,103,259 | Hitt | Dec. 28, 1937 |

FOREIGN PATENTS

| Number | Country | Date |
| --- | --- | --- |
| 654,693 | Germany | Dec. 27, 1937 |